(12) United States Patent
Battaglia (10) Patent No.: US 9,496,695 B2
(45) Date of Patent: Nov. 15, 2016

(54) ELECTRICAL OUTLET BOX ACOUSTIC SEAL

(75) Inventor: Paul L. Battaglia, Amherst, NY (US)

(73) Assignee: STC Architectural Products, LLC, Buffalo, NY (US)

( * ) Notice: Subject to any disclaimer, the term of this patent is extended or adjusted under 35 U.S.C. 154(b) by 1129 days.

(21) Appl. No.: 13/584,290

(22) Filed: Aug. 13, 2012

(65) Prior Publication Data

US 2014/0041927 A1 Feb. 13, 2014

(51) Int. Cl.
*H02G 3/22* (2006.01)
*H05K 3/38* (2006.01)
*H02G 3/08* (2006.01)
*H02G 3/14* (2006.01)

(52) U.S. Cl.
CPC ............... *H02G 3/088* (2013.01); *H02G 3/14* (2013.01)

(58) Field of Classification Search
CPC ................................. H02G 3/088; H02G 3/14
USPC ..................... 174/505, 50.54, 50.5
See application file for complete search history.

(56) References Cited

U.S. PATENT DOCUMENTS

| | | | |
|---|---|---|---|
| 2,983,399 A | 5/1961 | Slater et al. | |
| 3,489,242 A * | 1/1970 | Gladding | B32B 15/08 181/208 |
| 4,163,137 A * | 7/1979 | Close, Jr. | H02G 3/123 174/66 |
| 4,265,365 A * | 5/1981 | Boteler | H02G 3/088 174/53 |
| 4,293,173 A * | 10/1981 | Tricca | H01R 13/443 174/67 |
| 4,442,647 A * | 4/1984 | Olsen | B64C 1/40 244/119 |
| 4,484,021 A * | 11/1984 | Schaefer | H02G 3/18 174/53 |
| 4,616,104 A * | 10/1986 | Lindsey | H02G 3/125 174/503 |
| 4,642,418 A * | 2/1987 | Menchetti | H02G 3/14 174/503 |
| 4,667,840 A * | 5/1987 | Lindsey | H02G 3/125 174/504 |
| 4,794,207 A * | 12/1988 | Norberg | H02G 3/125 174/505 |
| 4,863,535 A | 9/1989 | More | |
| 5,004,115 A * | 4/1991 | L'Heureux | H02G 3/22 220/3.3 |
| 5,111,627 A * | 5/1992 | Brown | E04F 15/02005 52/126.5 |
| 5,226,076 A | 7/1993 | Baumhauer, Jr. et al. | |
| 5,343,713 A * | 9/1994 | Okabe | F24F 13/24 181/206 |
| 5,496,389 A * | 3/1996 | Wilcox | B01D 46/0002 55/473 |
| 5,697,194 A | 12/1997 | Gignac et al. | |
| 5,813,180 A | 9/1998 | Whitney et al. | |
| 5,906,287 A * | 5/1999 | Kohnen | H02G 3/14 206/223 |

(Continued)

OTHER PUBLICATIONS

Trademark Soundproofing, "Accoustical Outlet Backer Putty Pads", <http://www.tmsoundproofing.com/Acoustical-Outlet-Backer-Putty-Pads.html>, downloaded from Internet on Mar. 9, 2012, 2 pages.

(Continued)

*Primary Examiner* — Timothy Thompson
*Assistant Examiner* — Rhadames J Alonzo Miller (57) ABSTRACT

An electrical outlet box acoustic seal includes a seal body formed from a flexible sound suppressing material. The seal body has a front side, a rear side, and a peripheral edge. A seal rear projection extends from the seal rear side. The seal rear projection is configured to wrap around a front peripheral edge of an electrical outlet box having left and right sides, top and bottom sides, a rear side, and an open front defined by the outlet box front peripheral edge that provides access to an outlet box interior. When the outlet box is mounted in an opening formed in an architectural separation, and when the acoustic seal is installed on the outlet box, the seal rear projection inserts into a gap between the outlet box front peripheral edge and the opening of the architectural separation to assist in blocking noise transmission through the gap.

20 Claims, 10 Drawing Sheets

(56) References Cited

U.S. PATENT DOCUMENTS

| | | | |
|---|---|---|---|
| 6,207,085 B1 | 3/2001 | Ackerman | |
| 6,239,365 B1 | 5/2001 | McEvers | |
| 6,252,167 B1* | 6/2001 | Rose | H02G 3/088 174/66 |
| 6,521,834 B1* | 2/2003 | Dykhoff | C09K 21/00 174/66 |
| 6,595,476 B1* | 7/2003 | Edwards | E04B 9/006 248/200.1 |
| 7,114,727 B1 | 10/2006 | Goll | |
| 7,348,484 B1 | 3/2008 | Ackerman et al. | |
| 7,645,937 B2 | 1/2010 | Bhosale | |
| 7,851,703 B2* | 12/2010 | Drane | H05K 5/061 174/50 |
| 7,910,827 B2* | 3/2011 | Hur | H02G 3/14 174/50 |
| 8,022,298 B2* | 9/2011 | Husain | H01R 13/5213 174/481 |
| 8,222,522 B1* | 7/2012 | Easthouse | H02G 3/088 174/66 |
| 8,497,424 B2* | 7/2013 | Castaldo | H02G 3/081 174/50 |
| 2001/0009218 A1* | 7/2001 | Emaus | E04B 2/7425 198/813 |
| 2002/0125247 A1* | 9/2002 | Kruer | H02G 3/121 220/3.5 |
| 2005/0082081 A1* | 4/2005 | Marcou | H02G 3/14 174/67 |
| 2006/0040096 A1 | 2/2006 | Eadara et al. | |
| 2007/0175649 A1* | 8/2007 | Moselle | H02G 3/088 174/50 |
| 2008/0179073 A1* | 7/2008 | Drane | H01H 21/085 174/67 |
| 2008/0293293 A1* | 11/2008 | Drane | H02G 3/14 439/536 |
| 2008/0296039 A1* | 12/2008 | Dinh | H01R 13/447 174/58 |
| 2009/0224423 A1* | 9/2009 | Vigorito | B29C 45/14311 264/272.15 |
| 2009/0295103 A1* | 12/2009 | Ebina | B32B 18/00 277/650 |
| 2010/0000757 A1* | 1/2010 | Husain | H01R 13/5213 174/58 |
| 2011/0109050 A1* | 5/2011 | Kovacs | A62C 2/065 277/627 |
| 2011/0284320 A1 | 11/2011 | Bongiovi et al. | |

OTHER PUBLICATIONS

T. R. T Nightingale, "Effect of Electrical Outlet Boxes on Sound Insulation of a Double Leaf Wall", IRC Internal Report IR-772, Oct. 1998, pp. 1-23.

Ehow Contributor, "How to Reduce Noise (Soundproofing)", <http://www.ehow.com/how_4806926_reduce-noise-soundproofing.html>, downloaded from Internet on Mar. 9, 2012, 4 pages.

Google, "Gasket Covers, Electrical Outlet & Light Switch Plate Draft Stopper Foam Gaskets—New Resources Group-EK-OSG-24", <http://www.google.com/products/catalog?q=electrical . . . >, downloaded from Internet on Mar. 9, 2012, 2 pages.

Ace Hardware, "Ace 12RS/ACE "Ace" Electrical Outlet Seal Pack", <http://www.acehardwareoutlet.com/product/details . . . >, downloaded from Internet on Mar. 9, 2012, 1 page.

The Home Depot, "Taymac Black Rectangular Electrical Outlet Box Gaskets (2-Pack)", <http://www.homedepot.com/webapp/wcs/stores/se . . . >, downloaded from Internet on Mar. 9, 2012, 2 pages.

Metro Supply Company, "Sound Blocking Putty Pads for Electrical Outlets", <http://www.metrosupplycollc.com/Sound_Blockin . . . >, downloaded from Internet on Mar. 9, 2012, 2 pages.

Serious Energy, Inc., "Quiet Putty 380", 2011, 1 page.

Trade Sounproofing, "Understanding Flanking Noise", <http://www.tmsoundproofing.com/understanding-flanking-noise.html>, downloaded from Internet on Mar. 9, 2012, 8 pages.

Rectorseal, "BIOSTOP Firestop Gasket", Product Data Sheet, Jan. 2011, 2 pages.

Rectorseal, "Metacaulk, Cover Guard", Product Data Sheet, Jun. 2011, 2 pages.

Nuco, Inc., "OBG-700 Outlet Box Gasket", Technical Data Sheet, Mar. 2010, 2 pages.

* cited by examiner

ELECTRICAL OUTLET BOX ACOUSTIC SEAL

BACKGROUND

1. Field

The present disclosure relates to sound suppression and acoustical privacy in architectural structures. More particularly, the disclosure is directed to an acoustic seal for electrical outlet boxes installed in architectural separations.

2. Description of the Prior Art

By way of background, architectural separations such as partitions are intended to create acoustical privacy for individuals by producing confidentiality for conversations in the rooms on either side. These separations are rated for their "transmission loss" as measured under laboratory conditions. In actual practice, openings are field-cut or built into the separations, such as for recessed electrical outlet boxes. Openings for outlet boxes are seldom precisely cut such that gaps result around them. These gaps produce "flanking paths" for air-borne sound that severely compromises the transmission loss intended for the separation. The sound that invades through a flanking path comes through the openings no matter what is done with the separation. Applicant submits that this issue needs to be addressed if adequate levels of privacy and confidentiality are to be attained.

SUMMARY

An electrical outlet box acoustic seal is provided to improve the sound isolation performance of architectural separations by eliminating the detrimental sound transmission effects of common penetrations by electrical outlet boxes recessed into the separations. The acoustic seal includes a seal body comprising a flexible sound suppressing material. The seal has a seal front side, a seal rear side, and a seal peripheral edge separating the front and rear sides. A seal rear projection extends from the seal rear side. The seal rear projection is configured to wrap around a front peripheral edge of an electrical outlet box having left and right sides, top and bottom sides, a rear side, and an open front. The open front is defined by the outlet box front peripheral edge and provides access to an outlet box interior. When the outlet box is mounted in an opening formed in an architectural separation, and when the acoustic seal is installed on the outlet box, the seal rear projection inserts into a gap between the outlet box front peripheral edge and the opening of the architectural separation to assist in blocking noise transmission through the gap.

In an embodiment, the seal peripheral edge may be configured to conform to a peripheral edge of a cover plate for the outlet box. For example, the seal peripheral edge may have a front edge surface configured to seat against a rear side of the cover plate peripheral edge. In an embodiment, the front edge surface may be provided by a seal peripheral shoulder that is recessed below the seal front side. A base of the seal peripheral shoulder may intersect a front interior wall of the seal body that is tapered and extends from the base of the peripheral edge flange to a principal planar surface of the seal front side. The front interior wall may be configured to engage a corresponding tapered peripheral rim of the cover plate.

In an embodiment, the acoustic seal may further include a pair of upper and lower seal rear-side pockets on the seal rear side. These seal rear-side pockets are configured to accommodate mounting tabs of an electrical device adapted for attachment to the outlet box. The seal rear-side pockets interrupt the seal rear projection, forming gaps therein.

In an embodiment, the acoustic seal may further include one or more component-receiving openings on the seal body to allow one or more corresponding components of an electrical device to pass through the seal body. The acoustic seal may further include one or more fastener-receiving openings on the seal body to allow one or more mounting fasteners of a cover plate for the electrical outlet box to pass through the seal body. The one or more fastener-receiving openings may each include a fastener-receiving opening front end that is flush with a principal surface of the seal front side and a fastener-receiving opening rear end that is flush with a principal surface of the seal rear side.

In a further aspect, an electrical outlet box acoustic seal as disclosed herein is disposed in an acoustically sealed electrical outlet box installation. The installation includes an architectural separation having an opening therein. An electrical outlet box is mounted in the architectural separation opening. The outlet box has left and right sides, top and bottom sides, a rear side, and an open front defined by an outlet box front peripheral edge, the open front providing access to an outlet box interior. An electrical device is mounted to the outlet box. A cover plate is mounted to the electrical device using one or more cover plate fasteners, and covers the open front of the outlet box. The electrical outlet box acoustic seal is disposed between the outlet box and the cover plate.

BRIEF DESCRIPTION OF THE DRAWINGS

The foregoing and other features and advantages will be apparent from the following more particular description of example embodiments, as illustrated in the accompanying Drawings, in which.

DETAILED DESCRIPTION OF EXAMPLE EMBODIMENTS

Introduction

The electrical outlet box acoustic seal embodiments disclosed herein (box seals) are designed to improve the sound isolation performance of architectural separations by eliminating the detrimental sound transmission effects of common penetrations by electrical outlet boxes recessed into the separations. The disclosed box seal embodiments can be made of a relatively flat sheet of rubber or other suitable sound suppressing material in a configuration that closely matches a cover plate for an electrical outlet box that mounts an electrical device, such as a duplex AC receptacle, an AC power switch, an A/V (audio/visual) wiring outlet, or other electrical component. To achieve improved acoustical performance, a projection ("bulb") extends from the back plane of the seal. The projection fits into the gap between the field-cut gypsum board opening and the side of the outlet box. Interruptions in the projection and pockets in the back of the box seal may be fabricated to accommodate the ears of electrical devices. Alternatively, such structures can be field-cut to fit around the brackets of an old-work box. A peripheral edge of the box seal has a front surface configured to engage a peripheral edge of an electrical outlet box cover plate. In a first box seal embodiment designed for use with a duplex AC power receptacle, the portion of the box seal that extends over the cover plate mounting hole located between the receptacle sockets may be designed to prevent flexing and possible cracking of the cover plate. In a second box seal embodiment, the box seal is designed to be field-modified to fit different electrical devices in an outlet box. Imprinted lines may be provided to facilitate such field cutting for various standardized devices.

Advantageously, the disclosed box seal embodiments are expected to outperform the existing fiber gaskets and sealants that are currently used to acoustically insulate electrical outlet box installations, will be easy to install and remove, can be cheaply produced, and can be used not only in new construction, but also as a retrofit sound control improvement for billions of electrical outlet boxes currently in use.

Example Embodiments

Figure 1:
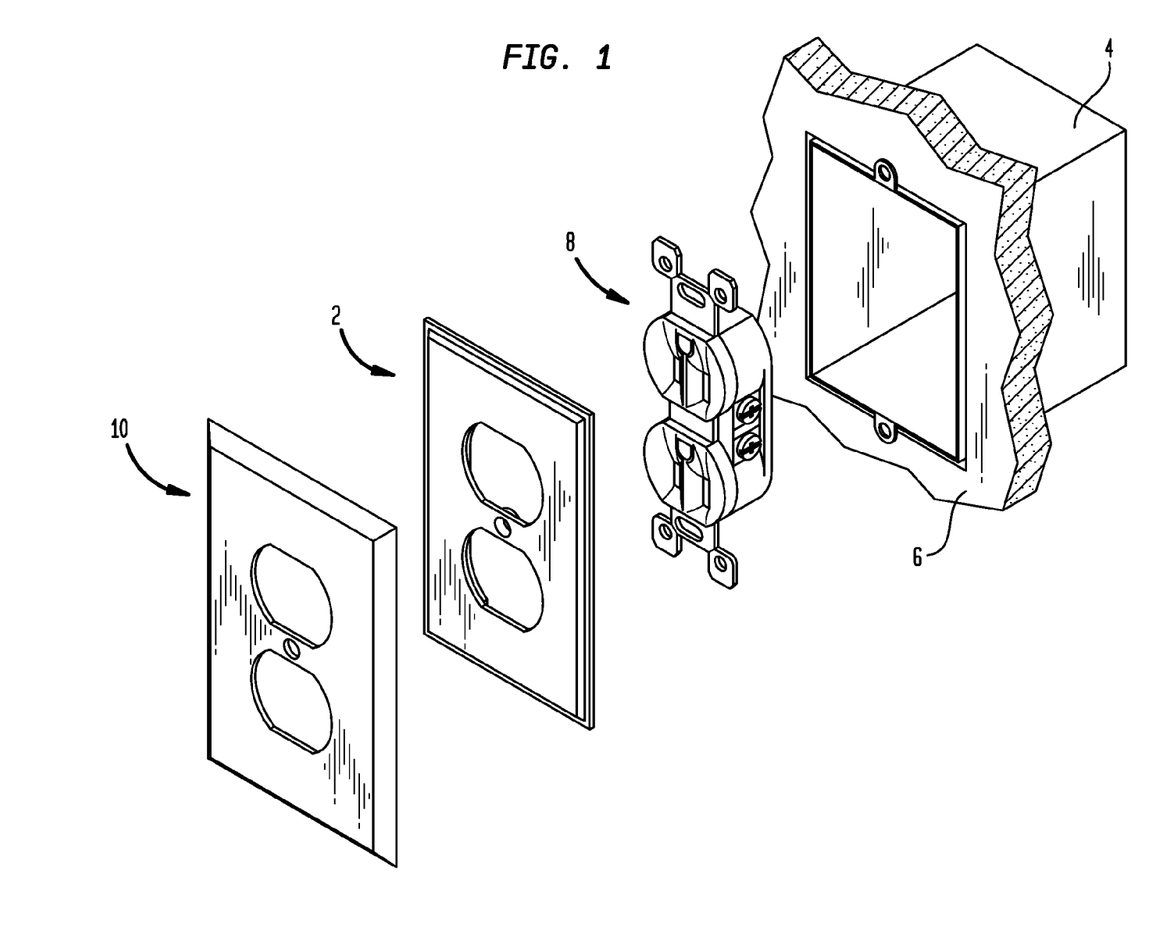
FIG. 1 is an exploded perspective showing an example electrical outlet box installation that includes a recessed electrical outlet box, a duplex AC power receptacle, a cover plate, and one possible embodiment of an acoustic seal according to the present disclosure.

Turning now to the drawings, wherein like reference numbers represent like structures in all of the several views, FIG. 1 depicts an acoustically sealed electrical outlet box installation that includes an electrical outlet box acoustic seal (box seal) 2, an electrical outlet box 4 mounted in an architectural separation 6 (such as a wall) having an opening therein, an AC duplex power receptacle 8 mounted to the outlet box 4, and a cover plate 10 mounted to the power receptacle. The box seal 2 is disposed between the electrical device 8 and the cover plate 10. It will be appreciated that box seals for other electrical devices, such as AC power switches and A/V wiring outlets, may also be constructed in accordance with the present disclosure. The illustrated embodiment showing a box seal 2 designed for an AC duplex power receptacle is thus disclosed for purposes of example only.

Turning now to FIGS. 2-8, the box seal 2 comprises a shaped seal body that can be made from a relatively flat sheet of flexible sound suppressing material, such as neoprene rubber, liquid silicone rubber (LSR), EPDM rubber, melamine foam, etc. Other sound suppressing materials could also be used. The box seal 2 has a continuous seal peripheral edge that includes a top edge portion 12, a bottom edge portion 14, a right side edge portion 16 and a left side edge portion 18. The box seal 2 further includes a seal front side 20 and a seal rear side 22 that are separated by the seal peripheral edge.

Figure 2:
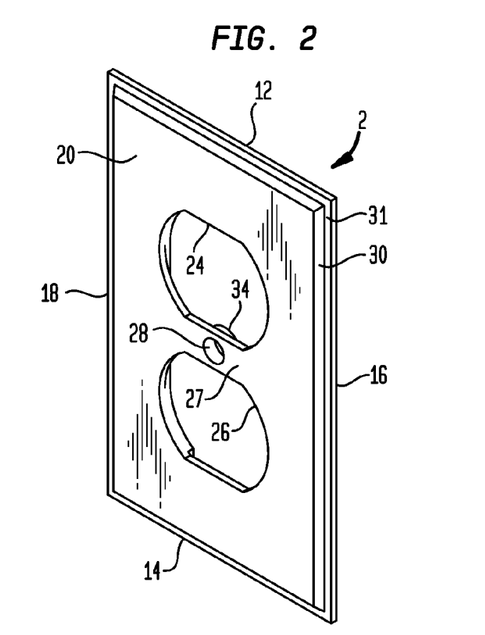
FIG. 2 is a front perspective view of the acoustic seal embodiment of FIG. 1.
Figure 3:
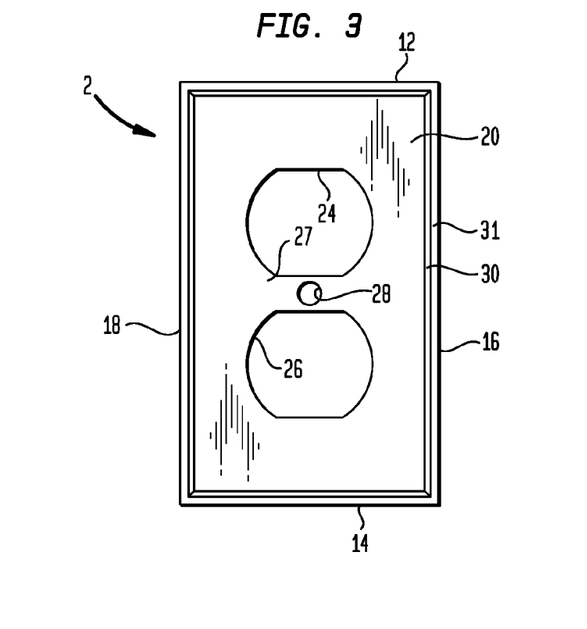
FIG. 3 is a rear perspective view of the acoustic seal embodiment of FIG. 1.

The seal front side 20 comprises a substantially planar principal surface that defines a front face of the box seal 2. A pair of component-receiving openings 24 and 26 are provided to allow the two receptacle components of the power receptacle 8 to pass through the seal body. The component-receiving openings 24 and 26 are separated by a central bridge member 27 that is formed with a central fastener-receiving opening 28. The fastener-receiving opening 28 allows a cover plate mounting fastener (not shown) to pass through the seal body when mounting the cover plate 10 to the power receptacle 8. It will be appreciated that different component openings and fastener-receiving openings could be provided for box seals designed for other electrical devices, such as AC power switches and A/V wiring outlets. As best shown in FIGS. 2 and 3, the principal surface of the seal front side 20 extends to, and is bounded by, a front interior wall 30 of the box seal 2. The front wall 30 is tapered, extending rearwardly and outwardly from the principal surface of the seal front side 20 to the base of a recessed peripheral shoulder 31 that extends outwardly from its base to the seal's continuous peripheral edge.

Figure 4:
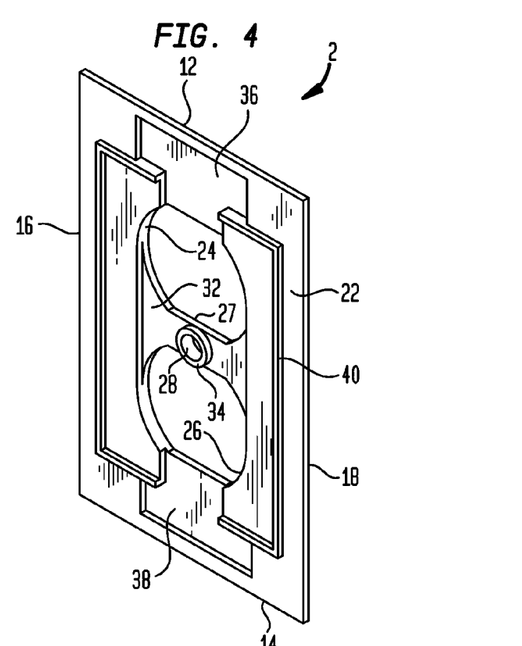
FIG. 4 is a front elevation view of the acoustic seal embodiment of FIG. 1.
Figure 5:
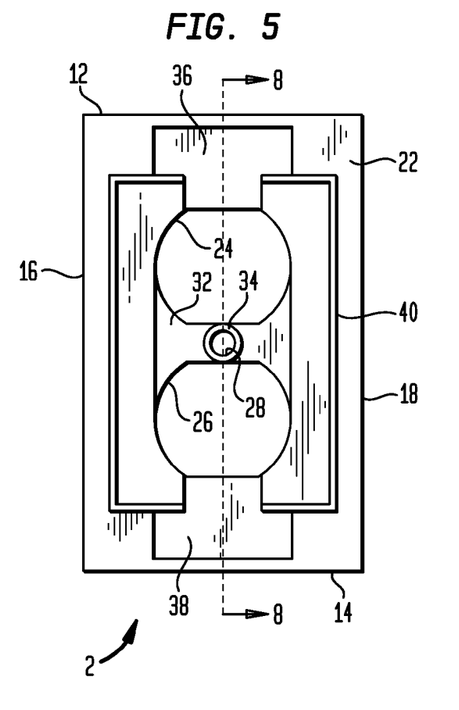
FIG. 5 is a rear elevation view of the acoustic seal embodiment of FIG. 1.
Figure 6:
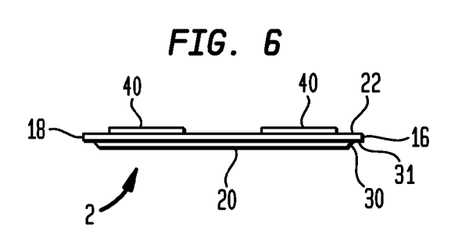
FIG. 6 is a top edge view of the acoustic seal embodiment of FIG. 1.
Figure 7:
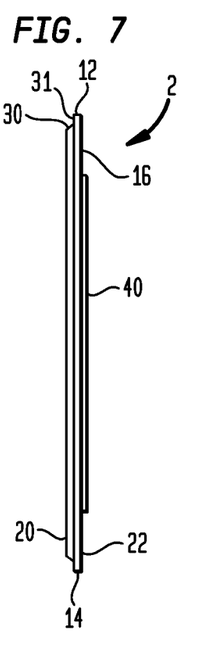
FIG. 7 is a side edge view of the acoustic seal embodiment of FIG. 1.
Figure 8:
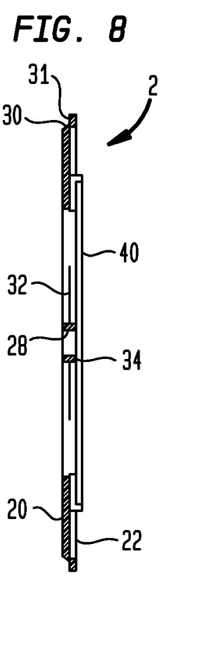
FIG. 8 is a cross-sectional view taken along line 8-8 in FIG. 5.

The seal rear side 22 comprises a generally planar principal surface, but this surface is interrupted with pockets and projections as will now be described. As can be seen in FIGS. 4 and 5, the rear side of the bridge member 27 is recessed from the principal surface of the seal rear side 22 to form a central rear-side pocket 32. At the center of the pocket 32 is a raised boss 34 that surrounds the fastener-receiving opening 28. The boss 34 defines the rear end of the fastener-receiving opening 28, which is flush with the principal planar surface of the seal rear side 22. As can be seen in FIG. 2, the front end of the fastener-receiving opening 28 is flush with the principal planar surface of the seal front side 20. Note that in lieu of forming the boss 34, the central pocket 32 could be eliminated, such that the bridge member 27 is a full thickness structure whose rear side is flush with the principal planar surface of the seal rear side 22. Alternatively, the central pocket 32 could remain, but the boss 34 could be eliminated or could be shorter in length so as not to extend to the principal planar surface of the seal rear side 20. A pair of upper and lower rear-side pockets 36 and 38 are also recessed from the principal surface of the seal rear side 22. The pockets 36 and 38 respectively intersect the component openings 24 and 26, and extend toward the seal peripheral edge portions 12 and 14. A seal rear projection 40 extends outwardly from the principal surface of the seal rear side 22. The seal rear projection 40 is continuous except where it is interrupted by the pockets 36 and 38. The reason for the foregoing surface configuration of the seal rear side 22 will become apparent from the ensuing description.

Figure 9:
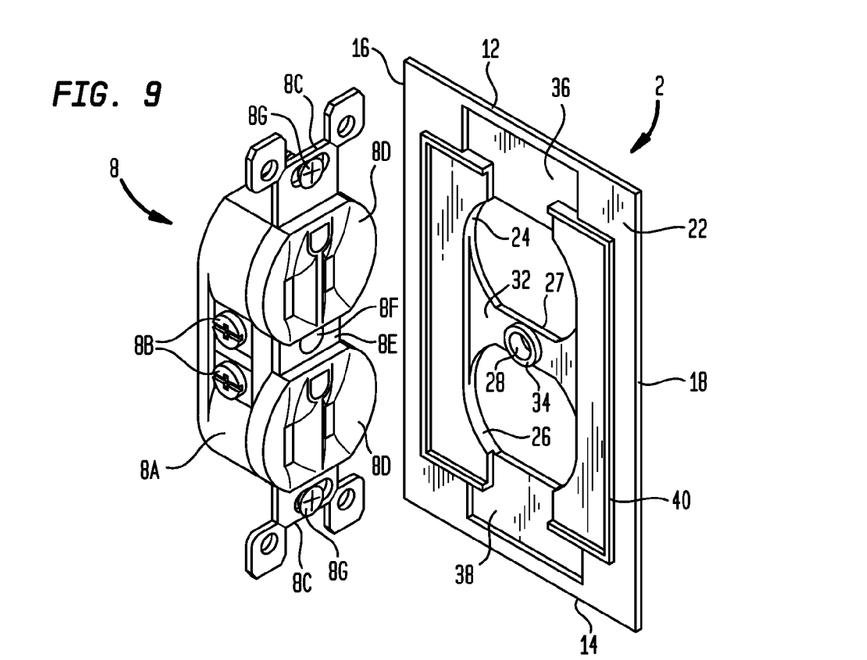
FIG. 9 is an exploded perspective view showing the rear of the acoustic seal embodiment of FIG. 1 positioned adjacent to the front of the AC receptacle of FIG. 1.
Figure 10:
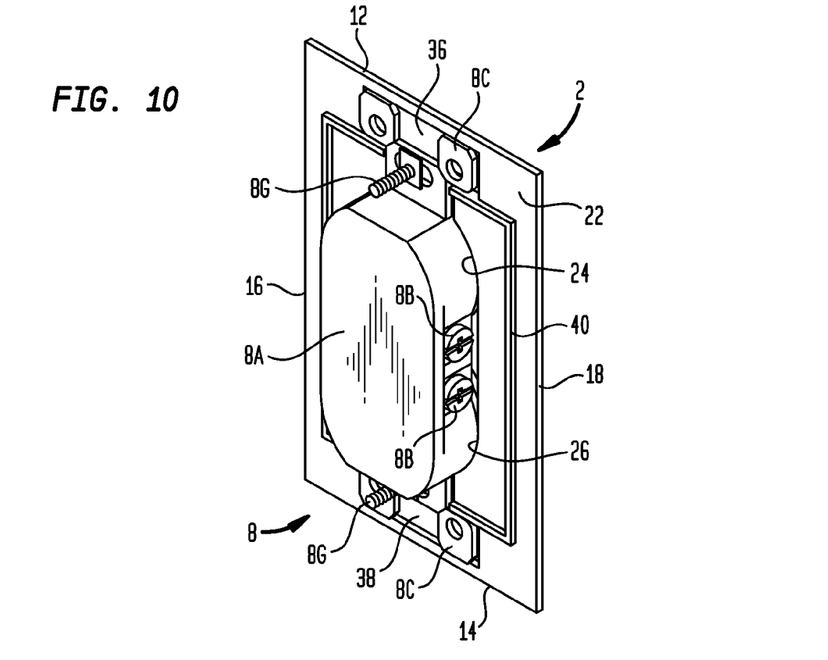
FIG. 10 is a rear perspective view showing the components of FIG. 8 mounted together.
Figure 11:
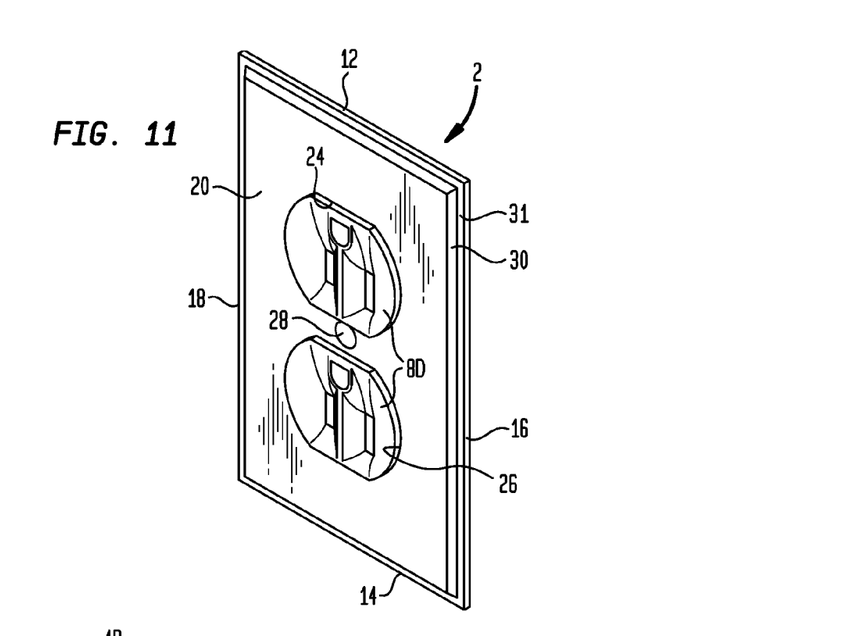
FIG. 11 is a front perspective view showing the components of FIG. 8 mounted together.

Turning now to FIGS. 9-11, the box seal 2 is shown in relation to the power receptacle 8 prior to and following interconnection of these components. The power receptacle 8 is of conventional design. It includes a housing 8A that carries electrical contacts 8B and a pair of upper and lower twin-eared mounting bracket tabs 8C. A molded front plate on the housing 8A is configured to define two outwardly projecting NEMA 5-15 plug receptacle components 8D that are separated by a transverse channel 8E. A cover plate mounting hole 8F is formed at the center of the transverse channel 8E. A pair of outlet box mounting screws are carried by the mounting tabs 8C.

As can be seen in FIG. 9, the component-receiving openings 24 and 26 of the box seal 2 are configured to receive the projecting plug receptacle components 8D. As shown in FIG. 11, the plug receptacle components 8D will project past the seal front side 20 following installation. Returning now to FIG. 9, the bridge member 27 is configured to fit within the transverse channel 8E. Following installation, the box seal's fastener-receiving opening 28 will centered over the power receptacle's cover plate mounting hole 8F, and the boss 34 will be seated on the surface of the transverse channel 8E. As shown in both FIGS. 9 and 10, the pockets 36 and 38 of the box seal 2 are configured to receive the twin-eared mounting tabs 8C of the power receptacle 8. The pockets 36 and 38 are preferably deep enough so that the rear side of the mounting tabs 8C will be flush with the principal surface of the seal rear side 22.

Figure 12:
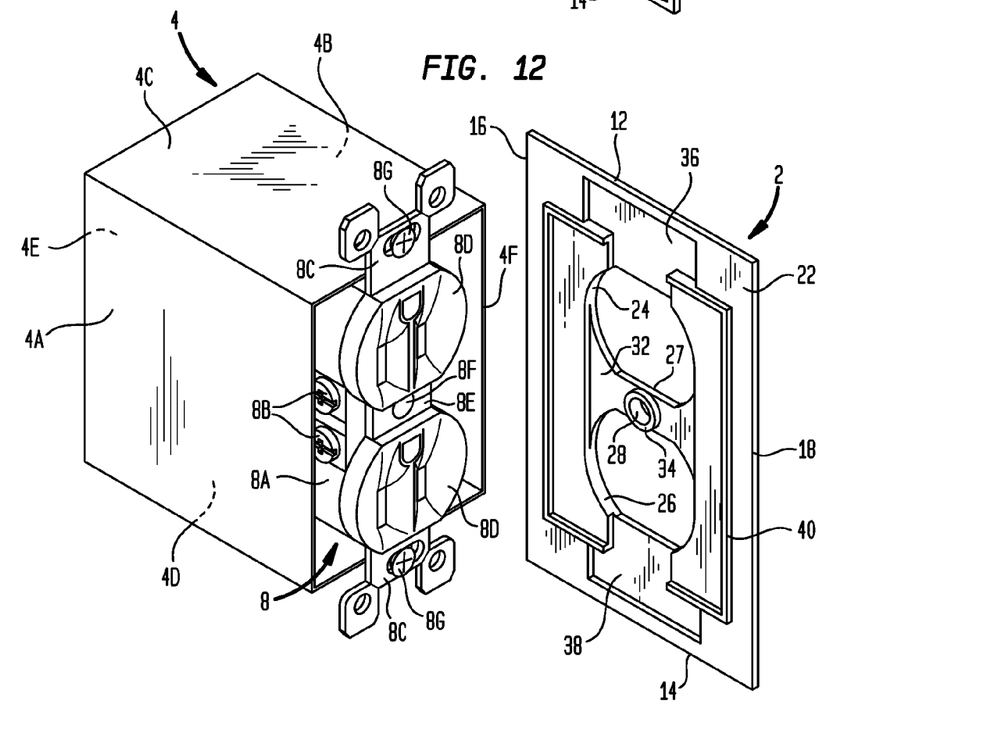
FIG. 12 is an exploded perspective view showing the rear of the acoustic seal embodiment of FIG. 1 positioned adjacent to the front of an assembly comprising the AC receptacle and the outlet box of FIG. 1.
Figure 13:
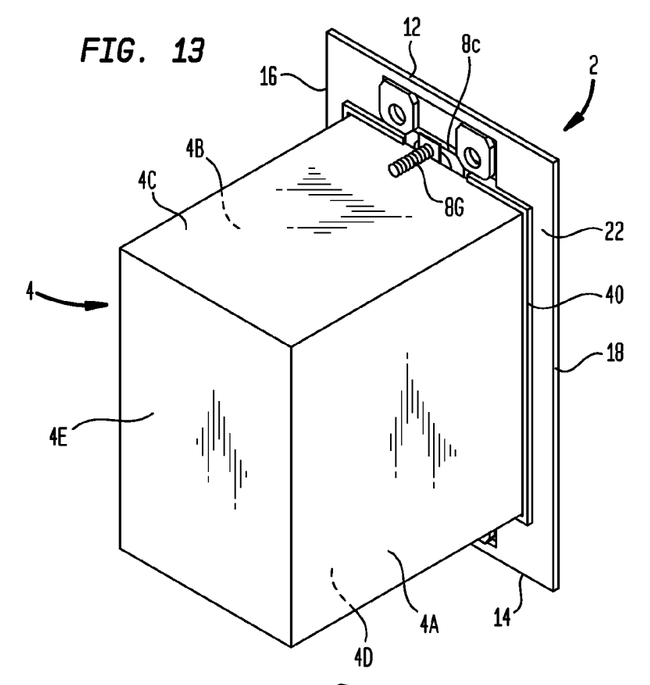
FIG. 13 is a rear perspective view showing the components of FIG. 12 mounted together.

FIG. 12 shows the power receptacle 8 mounted to the outlet box 4 to form an outlet box/power receptacle assembly. As can be seen, the outlet box includes a left side 4A, a right side 4B, a top side 4C, a bottom side 4D, and a rear side 4E. The outlet box 8 further includes a front peripheral edge 4F that defines an open front of the outlet box that provides access to the outlet box interior. The power receptacle 8 is attached to the outlet box 8 by threading the receptacle's outlet box mounting screws 8G through a pair of upper and lower mounting tabs (not shown) that respectively extend from the top and bottom sides 4C and 4D of the outlet box 4. As can be further seen in both FIGS. 12 and 13, the rear projection 40 of the box seal 2 is configured to wrap around the outlet box's front peripheral edge 4F.

Figure 14:
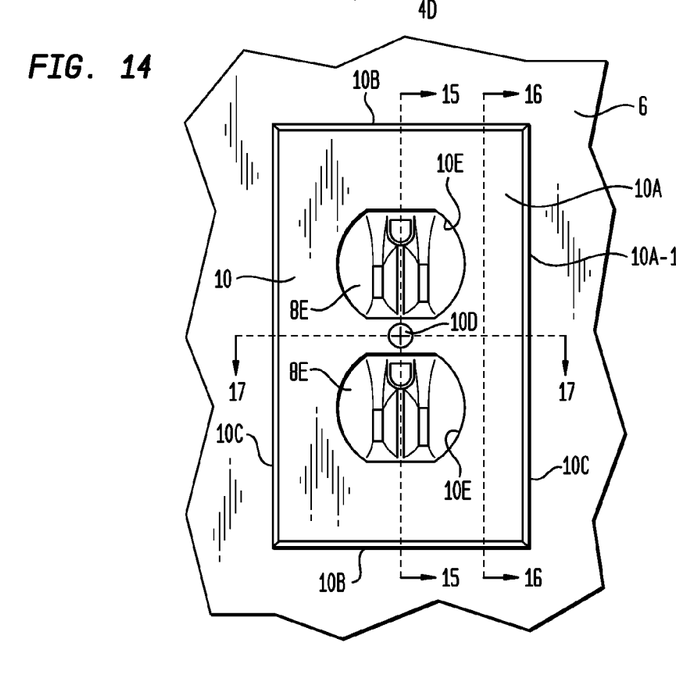
FIG. 14 is a front elevation view showing the electrical outlet box installation of FIG. 1.

FIG. 14 shows a front view of the electrical outlet box installation of FIG. 1. As can be seen, the outermost component of the installation is the cover plate 10. The cover plate 10 is conventionally designed for use with an AC duplex power receptacle. It includes a front face 10A comprising a principal planar surface surrounded by a rearwardly tapered peripheral rim 10A-1. The peripheral rim terminates at a continuous peripheral edge of the cover plate 10, which is formed by a pair of top and bottom edges 10B and a pair of side edges 10C. A cover plate mounting screw 10D extends through a corresponding hole (not shown) in the cover plate 10. It attaches the cover plate 10 to the underlying power receptacle 8 by threading into the receptacle's cover plate mounting hole 8F (see FIG. 12). The plug receptacle components 8D of the power receptacle 8 are accommodated by a pair of component-receiving openings 10E in the cover plate 10.

Figure 15:
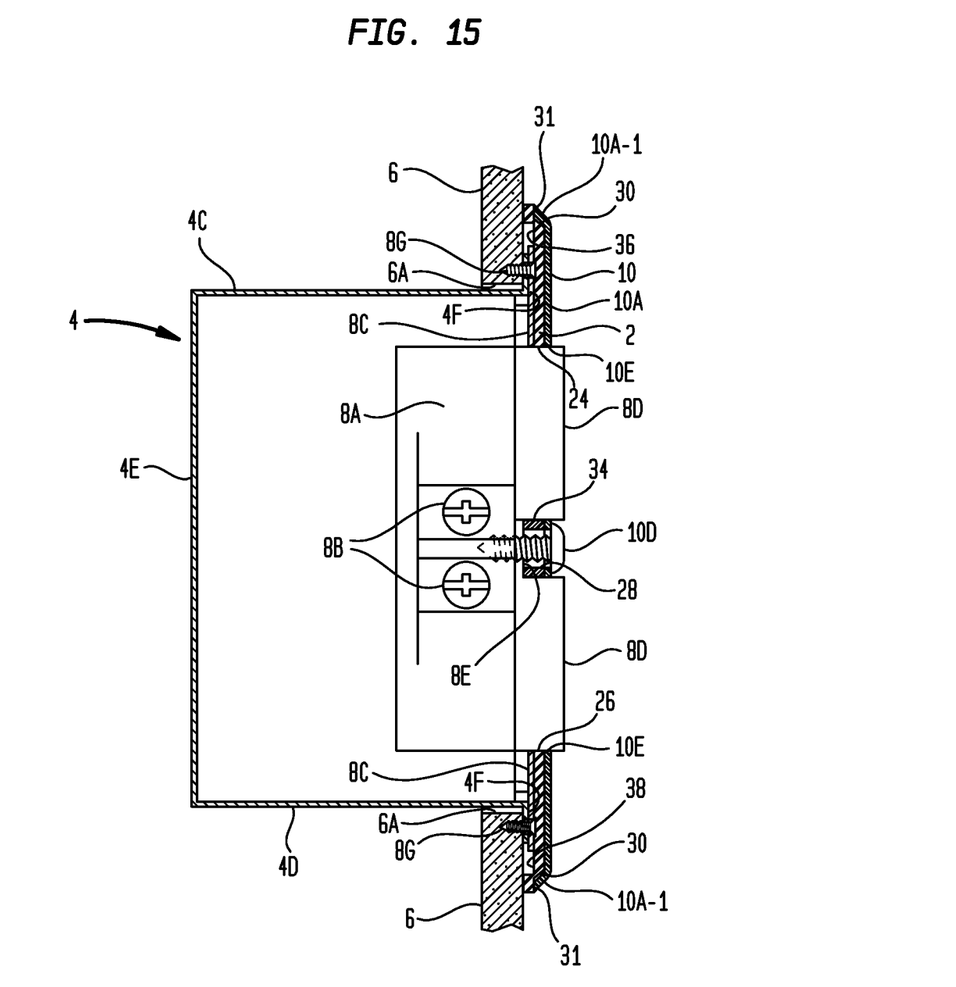
FIG. 15 is a cross-sectional view taken along line 15-15 in FIG. 14.
Figure 16:
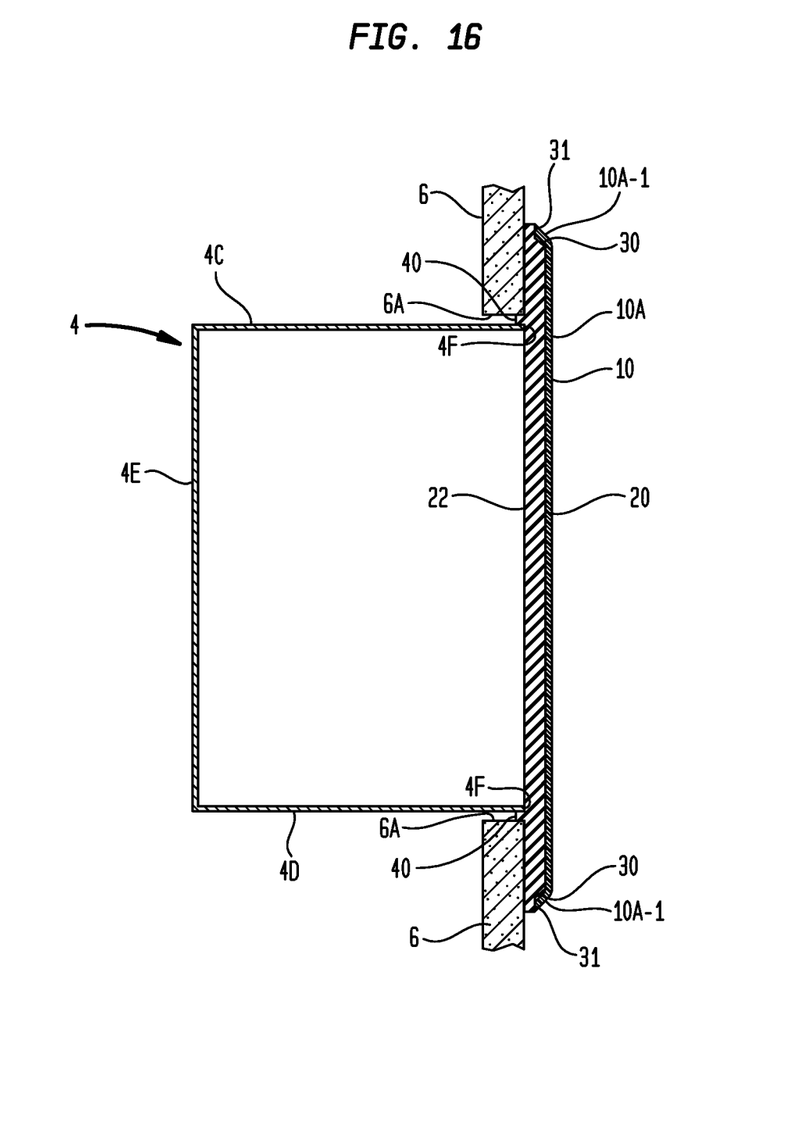
FIG. 16 is a cross-sectional view taken along line 16-16 in FIG. 14.
Figure 17:
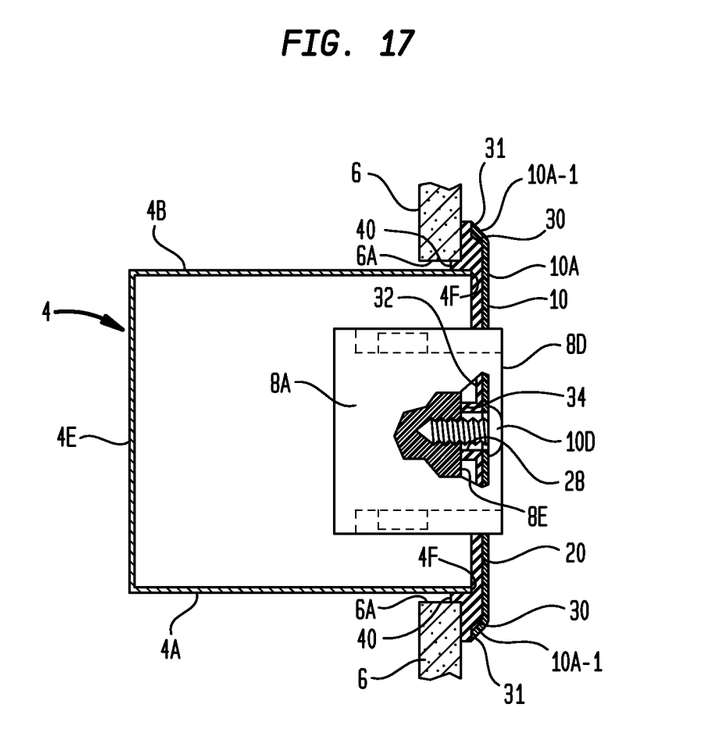
FIG. 17 is a cross-sectional view taken along line 17-17 in FIG. 14.

FIGS. 15-17 illustrate various cross-sectional views of the electrical outlet box installation of FIGS. 1 and 14. As can be seen, the outlet box 4 is mounted in an outlet box opening 6A formed in the architectural separation 6. The box seal 2 is installed on the outlet box/power receptacle assembly. In this installation configuration, the seal rear projection 40 inserts into the gap that exists between the outlet box front peripheral edge 4F and the outlet box opening 6A. This arrangement substantially blocks acoustic noise transmission that would otherwise pass through the gap unimpeded.

FIGS. 15-17 also illustrate that the peripheral edge of the box seal 2 conforms to the peripheral edge of the cover plate 10. In particular, the front surface of the recessed peripheral shoulder 31 of the box seal 2 seats against the rear side of the cover plate peripheral edge, thereby separating that edge from the surface of the architectural separation 6. The tapered front interior wall 30 of the box seal 2 also engages all or a portion of the tapered peripheral lip 10A-1 of the cover plate 10.

As additionally shown in FIGS. 15 and 17, the boss 34 that surrounds the box seal's fastener-receiving opening 28 fills the gap between the cover plate 10 and the transverse channel 8E of the power receptacle 8. This ensures that the cover plate 10 will not flex and crack when it is fastened to the electrical device 8 using the cover plate mounting screw 10D. Such cracking could occur if the raised boss 34 was eliminated or did not extend to the principal planar surface of the seal rear side 22.

Figure 18:
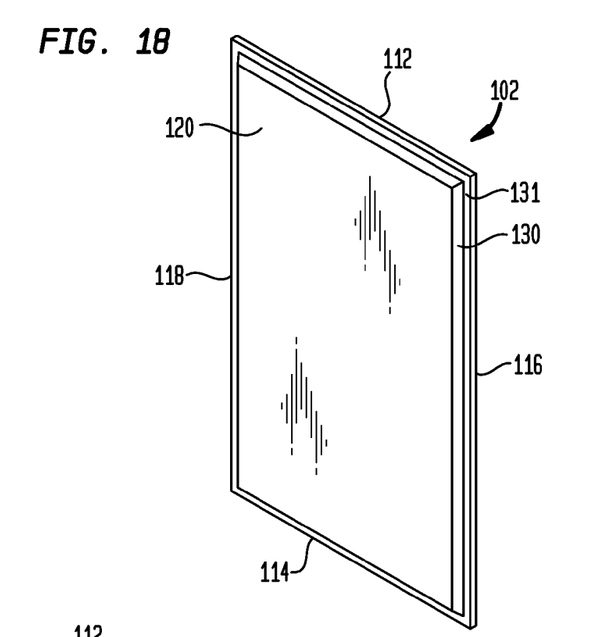
FIG. 18 is a front perspective view showing another possible embodiment of an acoustic seal according to the present disclosure.
Figure 19:
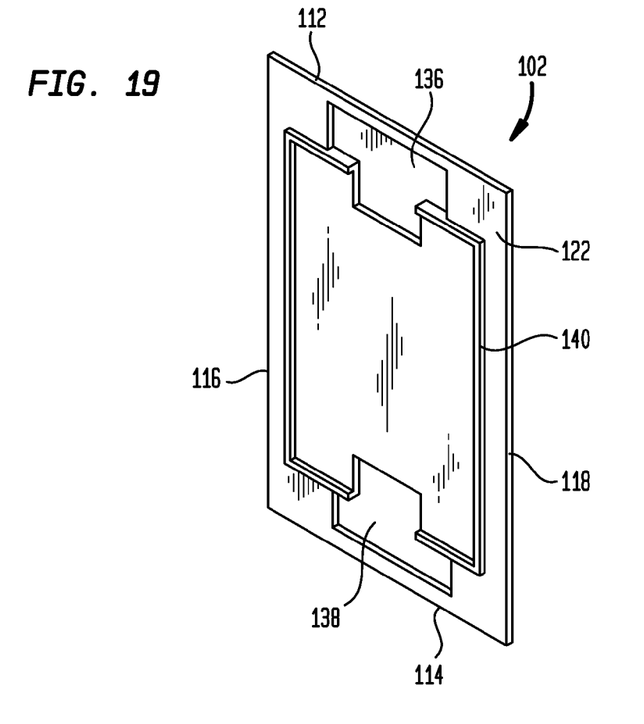
FIG. 19 is a rear perspective view showing the acoustic seal embodiment of FIG. 18.

Turning now to FIG. 18, an alternative box seal 102 is shown. This embodiment is somewhat similar to the box seal 2, as indicated by the use of corresponding reference numbers that have been incremented by 100. The box seal 102 thus includes a continuous peripheral edge comprising an upper edge portion 112, a lower edge portion 114, a right side edge portion 116 and a left side edge portion 118. The box seal further includes a pair of upper and lower rear-side pockets 136 and 138 that accommodate the mounting tabs of standard electrical devices, and a seal rear projection 140 configured to wrap around the peripheral edge of a standard electrical outlet box. The box seal 102 differs from the box seal 2 in that there are no component cutouts or fastener-receiving holes. Instead, the box seal 102 has no preformed openings, but can be customized for use with different electrical devices by making field-cut openings at an installation site. Although not shown, imprinted lines may be added on the seal front side 120 and/or the seal rear side 122 to provide cutout patterns corresponding to one or more standardized electrical devices. It will also be appreciated that although the pockets 136 and 138 have been preformed in the seal rear side 122 to accommodate standard electrical device mounting tabs, such structures could be field-cut at an installation site, for example, to fit around the brackets of an old-work box.

Accordingly, an acoustic seal for an electrical outlet box, together with an acoustically sealed electrical outlet box installation, have been disclosed. While various embodiments have been shown and described, it should be apparent that many variations and alternative embodiments could be implemented in accordance with the present disclosure. It is understood, therefore, that the invention is not to be in any way limited except in accordance with the spirit of the appended claims and their equivalents.

What is claimed is:

1. An electrical outlet box acoustic seal, comprising:
   a seal body formed from a flexible sound suppressing material;
   a seal front side on said seal body;
   a seal rear side on said seal body;
   a seal peripheral edge on said seal body, said seal peripheral edge separating said seal front side and said seal rear side;
   a seal rear projection extending from said seal rear side, said seal rear projection being configured to wrap around a front peripheral edge of an electrical outlet box having left and right sides, top and bottom sides, a rear side, and an open front defined by said outlet box front peripheral edge, said open front providing access to an outlet box interior;

said seal rear projection existing without said acoustic seal having to be installed on said outlet box; and whereby, when said outlet box is mounted in an opening formed in an architectural separation, and when said acoustic seal is installed on said outlet box, said seal rear projection inserts into a gap between said outlet box front peripheral edge and said opening of said architectural separation to assist in blocking noise transmission through said gap.

2. The acoustic seal of claim 1, wherein said sound suppressing material comprises a rubber material.

3. The acoustic seal of claim 1, wherein said sound suppressing material is selected from the group consisting of neoprene rubber, liquid silicone rubber, EPDM rubber, and melamine foam.

4. The acoustic seal of claim 1, wherein said seal peripheral edge is configured to conform to a cover plate peripheral edge of a cover plate for said outlet box, said seal peripheral edge having a front edge surface configured to seat against a rear side of said cover plate peripheral edge.

5. The acoustic seal of claim 4, wherein said front edge surface of said seal peripheral edge is recessed below a principal surface of said seal front side, said recessed front edge surface existing without said acoustic seal having to contact said cover plate.

6. The acoustic seal of claim 5, wherein said front edge surface of said seal peripheral edge is provided by a recessed seal peripheral shoulder that exists without said acoustic seal having to contact said cover plate.

7. The acoustic seal of claim 6, wherein a base of said seal peripheral shoulder intersects a seal tapered interior wall that extends downwardly and rearwardly from said principal surface of said seal front side to a base of said seal peripheral shoulder, said seal tapered interior wall being configured to engage a corresponding tapered peripheral lip portion of said cover plate and existing without said acoustic seal having to contact said cover plate.

8. The acoustic seal of claim 1, wherein said acoustic seal further includes a pair of seal rear-side pockets on said seal rear side that are configured to accommodate mounting tabs of an electrical device adapted for attachment to said outlet box, said seal rear-side pockets existing without said acoustic seal having to contact said mounting tabs.

9. The acoustic seal of claim 8, wherein said seal rear-side pockets interrupt said seal rear projection.

10. The acoustic seal of claim 8, wherein said electrical device comprises a duplex AC power receptacle.

11. The acoustic seal of claim 1, further including one or more component-receiving openings on said seal body to allow one or more corresponding components of an electrical device to pass through said seal body.

12. The acoustic seal of claim 11, further including one or more fastener-receiving openings on said seal body to allow one or more mounting fasteners of a cover plate for said outlet box to pass through said seal body.

13. The acoustic seal of claim 12, wherein said one or more fastener-receiving openings each include a fastener-receiving opening front end that is flush with a principal surface of said seal front side and a fastener-receiving opening rear end that is flush with a principal surface of said seal rear side.

14. The acoustic seal of claim 13, wherein said electrical device comprises a duplex AC power receptacle, wherein there are two of said component-receiving openings and one of said fastener-receiving openings located on a transverse bridge portion of said seal body that extends between said component-receiving openings.

15. The acoustic seal of claim 14, wherein said seal bridge portion is recessed from seal rear side except for a raised boss surrounding said seal fastener-receiving opening that defines said fastener-receiving opening rear end, said raised boss existing without said acoustic seal having to contact said AC power receptacle.

16. An acoustically sealed electrical outlet box installation, comprising:

an architectural separation having an opening therein;

an electrical outlet box mounted in said architectural separation opening, said outlet box having left and right sides, top and bottom sides, a rear side, and an open front defined by an outlet box front peripheral edge, said open front providing access to an outlet box interior;

an electrical device mounted on said outlet box, said electrical device including mounting tabs attached to said outlet box via fasteners, one or more electrical device components extending from said open front of said outlet box, and a body portion disposed in said outlet box interior;

a cover plate mounted to cover said open front of said outlet box with one or more cover plate fasteners;

an electrical outlet box acoustic seal disposed between said outlet box and said cover plate, said seal comprising:

a seal body formed from a flexible sound suppressing material;

a seal front side on said seal body;

a seal rear side on said seal body;

a seal peripheral edge on said seal body, said seal peripheral edge separating said seal front side and said seal rear side; and a seal rear projection extending from said seal rear side, said seal rear projection being configured to wrap around said outlet box front peripheral edge such that said seal rear projection inserts into a gap between said outlet box front peripheral edge and said opening of said architectural separation to assist in blocking noise transmission through said gap, said seal rear projection existing without said acoustic seal having to be installed on said outlet box.

17. The electrical outlet box installation of claim 16, wherein said seal peripheral edge is configured to conform to a peripheral edge of said cover plate, said seal peripheral edge having a front edge surface configured to seat against a rear side of said cover plate peripheral edge.

18. The electrical outlet box installation of claim 16, further including:

a pair of seal rear-side pockets on said seal rear side that are configured to accommodate said mounting tabs of said electrical device, said seal rear-side pockets existing without said acoustic seal having to contact said mounting tabs;

one or more component-receiving openings on said seal body to allow said one or more electrical device components to pass through said seal body;

one or more seal fastener-receiving openings on said seal body to allow said one or more cover plate fasteners to pass through said seal body; and said one or more seal fastener-receiving openings each including a fastener-receiving opening front end that is flush with a principal surface of said seal front side and a fastener-receiving opening rear end that is flush with a principal surface of said seal rear side.

19. The electrical outlet box installation of claim 18, wherein said electrical device comprises a duplex AC power receptacle, wherein said seal comprises two of said component-receiving openings and one of said fastener-receiving openings located on a transverse bridge portion of said seal body that extends between said component-receiving openings.

20. An electrical outlet box acoustic seal, comprising:
a seal body formed from a flexible sound suppressing rubber material;
a seal front side on said seal body;
a seal rear side on said seal body;
a seal peripheral edge on said seal body, said seal peripheral edge separating said seal front side and said seal rear side;
a seal rear projection extending from said seal rear side, said seal rear projection being configured to wrap around a front peripheral edge of an electrical outlet box having left and right sides, top and bottom sides, a rear side, and an open front defined by said outlet box front peripheral edge, said open front providing access to an outlet box interior;
said seal rear projection existing without said acoustic seal having to be installed on said outlet box;
whereby, when said outlet box is mounted in an opening formed in an architectural separation, and when said acoustic seal is installed on said outlet box, said seal rear projection inserts into a gap between said outlet box front peripheral edge and said opening of said architectural separation to assist in blocking noise transmission through said gap;
said seal peripheral edge being configured to conform to a peripheral edge of a cover plate for said outlet box, said seal peripheral edge having a front edge surface configured to seat against a rear side of said cover plate peripheral edge;
said front edge surface of said seal peripheral edge being recessed below a principal surface of said seal front side and provided by a recessed seal peripheral shoulder that exists without said acoustic seal having to contact said cover plate;
a base of said seal peripheral shoulder intersecting a seal tapered interior wall that extends downwardly and rearwardly from a principal surface of said seal front side to a base of said seal peripheral shoulder, said seal tapered interior wall being configured to engage a corresponding tapered portion of said rearwardly extending peripheral lip of said cover plate and existing without said acoustic seal having to contact said cover plate;
said acoustic seal further including a pair of seal rear-side pockets on said seal rear side that are configured to accommodate mounting tabs of an electrical device adapted for attachment to said outlet box, said seal rear-side pockets interrupting said seal rear projection and existing without said acoustic seal having to contact said mounting tabs;
said acoustic seal further including one or more component-receiving openings on said seal body to allow one or more corresponding components of an electrical device to pass through said seal body;
said acoustic seal further including one or more fastener-receiving openings on said seal body to allow one or more mounting fasteners of a cover plate for said outlet box to pass through said seal body; and
said one or more fastener-receiving openings each including a fastener-receiving opening front end that is flush with said principal surface of said seal front side and a fastener-receiving opening rear end that is flush with a principal surface of said seal rear side.

* * * * *